United States Patent [19]

Hartmann et al.

[11] Patent Number: 5,468,146
[45] Date of Patent: Nov. 21, 1995

[54] BILLET LIVE ROLLER FEED BED UPSTREAM OF COOLING BEDS

[75] Inventors: Hans H. Hartmann, Aliquippa, Pa.; Hans-Peter Drügh, Zülpich; Hans J. Reismann, Düsseldorf, both of Germany

[73] Assignee: SMS Schloemann-Siemag AG, Düsseldorf, Germany

[21] Appl. No.: 163,196

[22] Filed: Dec. 6, 1993

Related U.S. Application Data

[63] Continuation of Ser. No. 881,446, May 11, 1992, abandoned.

[30] Foreign Application Priority Data

May 10, 1991 [DE] Germany ............ 41 15 363.4

[51] Int. Cl.$^6$ ............ B22D 47/00; F27D 15/02
[52] U.S. Cl. ............ 432/77; 432/246; 198/612; 198/598; 198/467.1
[58] Field of Search ............ 432/234, 235, 432/236, 127, 246, 77.78; 198/467.1, 457, 612, 598

[56] References Cited

U.S. PATENT DOCUMENTS

| | | | |
|---|---|---|---|
| 2,023,126 | 12/1935 | Fahrenwald | 432/246 |
| 2,904,163 | 9/1959 | Golding et al. | 198/598 |
| 2,959,268 | 11/1960 | McConnell | 198/467.1 |
| 2,976,980 | 3/1961 | Rodder | 198/612 |
| 4,214,868 | 7/1980 | Tabuchi | 432/246 |

*Primary Examiner*—Willis R. Wolfe
*Attorney, Agent, or Firm*—Anderson Kill Olick & Oshinsky

[57] ABSTRACT

A billet live roller bed upstream of cooling beds, where conveyor rollers designed in a worm or screw shaped manner and arranged to be parallel to the roller bed rollers transfer the rolled materials transversely to the conveyance direction onto the cooling bed, can be adapted to changing rolling speeds with small resources in machining technology, if the transverse conveyor rollers have screw turns with different pitches.

5 Claims, 3 Drawing Sheets

Fig. 2 0°
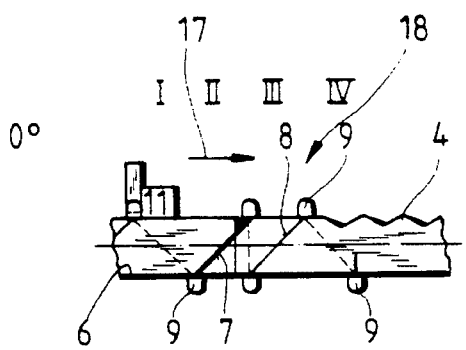
Fig. 3 180°
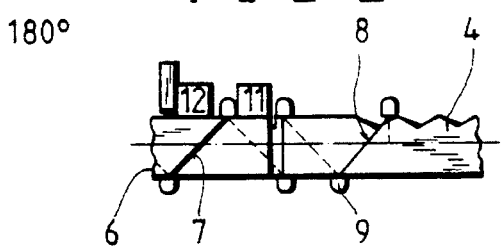
Fig. 4 360°
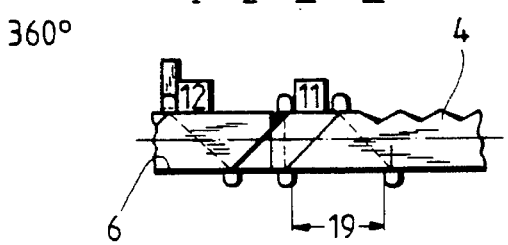
Fig. 5 540°
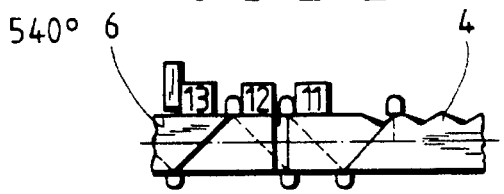
Fig. 6 720°
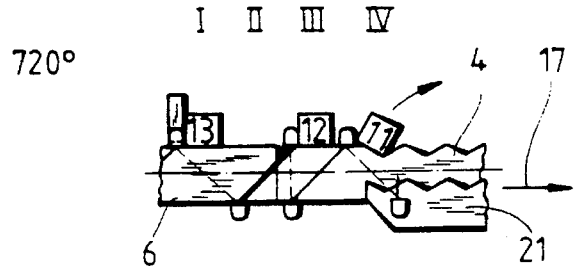
Fig. 7 900°
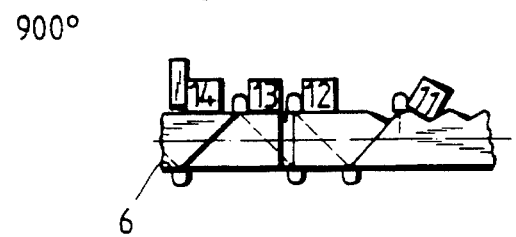

1080°

1260°

1440°

1620°

1800°

BILLET LIVE ROLLER FEED BED UPSTREAM OF COOLING BEDS

This is a continuation of application Ser. No. 07/881,446 filed May 11, 1992, now abandoned.

BACKGROUND OF THE INVENTION

The invention deals with a billet live roller feed bed upstream of cooling beds, where worm type conveyor rollers, arranged parallel to the roller bed rollers, transfer the rolled material onto the cooling bed transversely to the conveyance direction.

Prior to transferring the billets, coming finish-rolled and subdivided into commercial lengths from a rolling mill to the cooling bed, it is necessary to brake the billets to a stop. Only then are they lifted onto the cooling bed in accordance with the cooling bed cycle, or they slide in a known manner known such as onto the first grate of the cooling bed. Since, to be sure, billets having different dimensions are rolled in a rolling mill, it is unavoidable that the billets arrive on the runout table with speeds differing considerably from each other, this from one to another dimension, because billets of smaller cross-section are rolled at a speed several times higher in comparison with the largest possible billet dimension to be rolled in the rolling mill.

The runoff speed, changing as a function of the rolling program, results in the billets having braking travels of different length, which billets must come to a stop prior to being transferred to the cooling bed. It must be borne in mind that the square of the travel speed is inserted when calculating the braking travel, assuming a constant coefficient of friction $\mu$. For a smooth operational sequence and an occupancy of the cooling bed according to the cooling bed cycle, in spite of that, considerable control measures and a large construction resource are required in known cooling beds, as for instance in a live roller feed bed of this type the coupling of several rolls which requires appropriate clutches.

SUMMARY OF THE INVENTION

It is an object of the invention to adapt a billet live roller feed bed of the previously discussed type to changing rolling speed with the use of minor resources of machine technology, and to simplify the passing of the billets over to a cooling bed.

Pursuant to this object, and others which will become apparent hereafter, one aspect of the present invention resides in the transverse conveyor rollers having screw or spiral turns of differing pitch. Surprisingly, it can be achieved by this measure always to maintain a defined braking and discharge position independently of the rolling or billet speed, which means that a constant spacing of the billets is always assured. Due to the difference in pitch a third, namely an intermediate, position is possible between the entry position of the billet and the braking position on the runout table. A billet occupying the intermediate position is conveyed further at constant speed (runout table speed). The braking is initiated from the intermediate position, and because of the screw pitch there results preferably in the course of a 180° rotation of the transverse conveyor rollers a sideways displacement of this billet into the braking position, without that a following subsequent billet located in the entry position being affected. A subsequent billet remains without change in the entry position during displacement of the preceding billet.

It is advisable to arrange a brake chute within the braking region for braking the billet to the braked position.

If the pitch of a first screw turn, emanating from the ends of the transverse conveyor rollers facing away from the cooling bed, corresponds to at least two times the largest occurring billet dimension plus the bead thickness or width and a second screw turn, extending in a braking region configured at the ends of the transverse conveyor rollers facing the cooling bed, is provided with a zero pitch across a 180° sector of the transverse conveyor rollers, the transverse conveyor rollers displacing the billets can be coordinated in such a way, with the turnover cooling bed preferably designed as a notched bar cooling bed, that a billet arrives into the braking position after one revolution of the transverse conveyor rollers, meaning it is resting on the braking chute and comes to a complete stop there. After a further, thus second, complete revolution of the transverse conveyor rollers the billet is transferred from the braking chute to the notched bar cooling bed which is matched, as far as its graduation (rake recesses) is concerned, to the displacement sequence caused by the conveyor rollers (the billet is dumped). Simultaneously with this, a following billet is transversely conveyed from the entry position into the braking position.

The angular value of the roller revolution defining the pitch is not limited to a 180° division. It can be chosen at random, wherein however at the front, meaning at the ends of the conveyor rollers facing away from the cooling bed, it must always be greater than at the rear, meaning at the ends facing the cooling bed. The pitch of the screw turn at the roller rear ends is in addition dependent upon the tooth pitch of the notched bar cooling bed taking over the billet.

The operational sequence described above is repeated in accordance with the quantity of the entering billets, wherein the screw turn designed in the braking region without a pitch upon a 180° segment of the transverse conveyor rollers assures that the billet occupying its position in the braking position is not affected during the displacement of a following billet into the intermediate position, which entails a 180° turn of the conveyor rollers. It makes no difference with what speed the rolling mill functions, a billet remains always in the braked position of rest until a following billet has arrived in the braking position. Only then is the preceding billet transferred onto the cooling bed. The transverse conveyor rollers receive their set or desired values from an overriding control of the rolling mill. They are driven by rpm regulated DC motors, and their initial position for the respective rotations of preferably 180° is observed electromechanically by means of a monitoring system.

The transverse conveyor rollers can be provided with beads forming the helical or screw turns, which beads can be applied for instance by welding, so that existing runout tables can also be subsequently reworked without requiring new rollers. With newly fabricated rollers the screw turns can be directly cast on during the manufacturing process. Because of the pitch of the screw turns, billets move from one position into the next one with each 180° turn o*f the transverse conveyor rollers, with the intermediate positions of rest described. When dimensioning the pitch of the screw turn at the front roller end, it must be based on two times the largest billet dimension which has to be rolled, including the thickness of the beads forming the screw turn.

The ends of the transverse conveyor rollers facing the cooling bed can expediently be designed for the transfer of the billets from the first into the second notch of the rake. This enables a double occupancy of the cooling bed with billets of small dimensions and thus a rapid cyclical follow up sequence. On the other hand, only every second notch is occupied if one is dealing with large billet dimensions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2–12 show diagrammatically a side view of a conveyor roller of a transverse conveyor directing billets onto a rake-type cooling bed, in different operating stages.

DETAILED DESCRIPTION OF THE PREFERRED EMBODIMENTS

Figure 1:
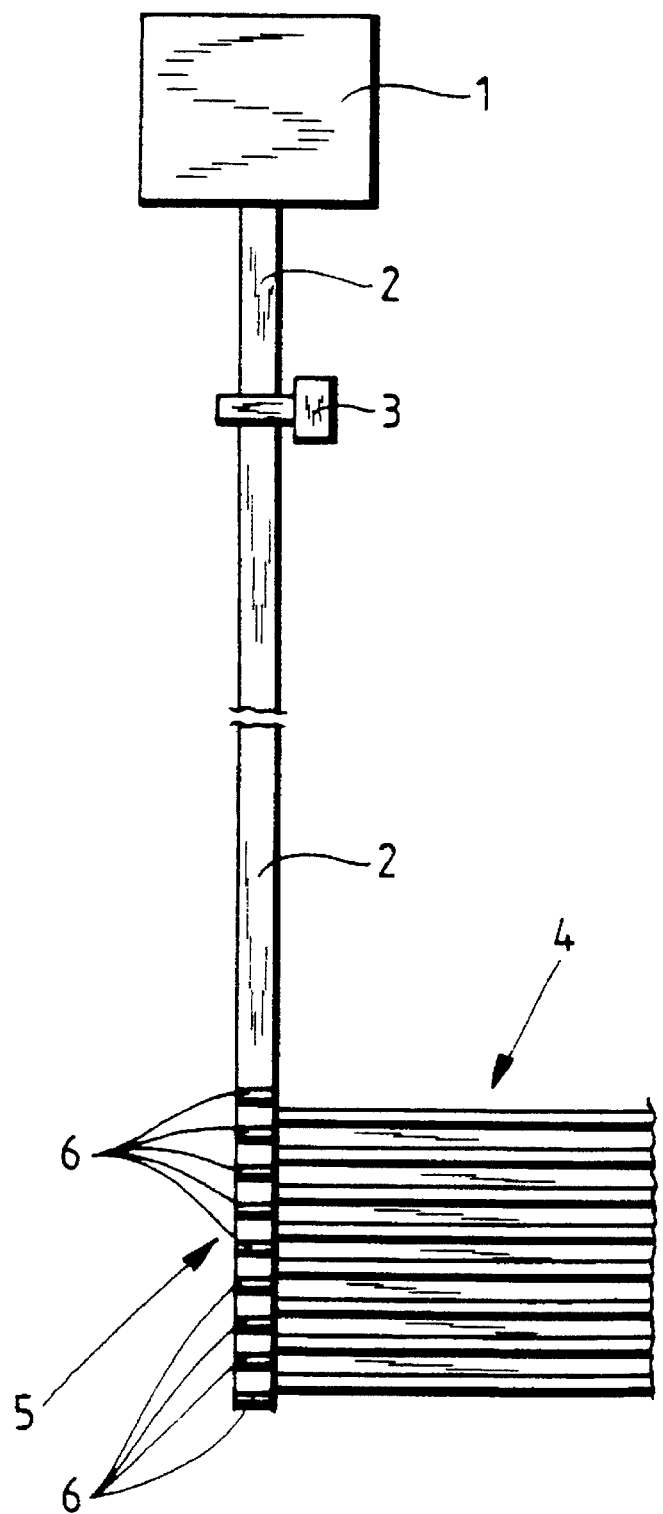
FIG. 1 shows diagrammatically a live roller feed bed next to a cooling bed in plan view.

As shown in FIG. 1, there follows upon a rolling mill 1 a live roller feed bed 2 with dividing shears 3 integrated therein for subdividing the rolled strand into cooling bed lengths which are dependent upon the longitudinal dimensions of a downstream turning cooling bed 4 configured as a rake-type cooling bed and the permissible minimum and maximum dimensions of the partial lengths depending upon the cooling bed cycle. A transverse conveyor 5 is located upstream of the cooling bed 4 and consists of numerous transverse conveyor rollers 6, shown in FIG. 1 by a thick line, arranged to be parallel to the runout table rollers. These rollers are equipped with beads 9 (compare FIG. 2) extending helically across the roller length and forming screw or worm turns 7, 8 of differing pitch, with billets delivered by the live roller feed bed 2 to the transverse conveyor 5 being moved by the beads 9 of respective screw turns 7 and 8.

As is shown in detail in FIGS. 2–12 with an example of six billets numbered 11 to 16 running out onto the transverse conveyor 5, the billet 11, which has to be transferred in a conveyance direction 17 onto the cooling bed 4, arrives in the entry position I upon the transverse conveyor roller 6 at the ends of the transverse conveyor roller 6 facing away from the cooling bed. The distance traveled from the entry position in the transverse conveying direction 17 to the cooling bed 4 is apart from this subdivided in the sequence shown into an intermediate position II, a braking position III and a dumping or throw off position IV. In a braking region 18 of the transverse conveyor facing the cooling bed 4, a braking shoot (not shown) here is arranged, which brakes the billets 11 to 16 to a complete stop prior to the dumping or transferring onto the cooling bed 4.

The pitch of the screw turn 7 of the transverse conveyor rollers 6 corresponds to twice the largest encountered billet dimension plus the wall thickness of the bead 9 (compare, for example, FIG. 3). With a 180° turn of the transverse conveyor roller 6, the billet 11 comes out of the entry position I and arrives into the intermediate position II and thus creates space for the first following billet 12 (compare a and b in FIG. 2) running out onto the transverse conveyor roller 6. The first billet 11 occupying the intermediate position II is to begin with conveyed further at the constant speed of the roller runout table, before exiting out of this position due to a transverse conveyance caused by the screw turn 7 into the braking position III of the braking region 18, meaning upon the brake chute arranged there. As can be seen from FIG. 4 showing the conveyor roller 6 after a complete revolution, the following billet 12 remains in the entry position I and is not subjected to any transverse motion along the roller 6 during the period of the transverse conveyance of the billet 11 from the intermediate position II to the braking position III. The billet 12 remains at the entry position I because, due to the large pitch of the screw turn 7, the billet 12 is not engaged by a respective bead 9 until the preceeding billet II arrives at the braking position III. Only after the second following billet 13 has arrived in the region of the entry position I of the transverse conveyor rollers 6, is the preceding following billet 12 displaced into the adjacent, or intermediate, position II (compare FIG. 2d). Herein however the first billet 11 is not conveyed further, but rather remains in the braking position III.

The displacement of the first following billet 12 without affecting the billet 11 is achieved by providing a zero pitch on the screw turn 8 across a sector 19 diagrammatically designated by 180° in FIG. 4 with the screw turn 8 being located in the braking region. As seen from FIG. 5, the billets 11 to 13 which have run out up to now lie, after 380° rotation of the transverse conveyor roller 6, directly next to each other in the positions I to III.

Upon an additional 180° rotation as shown in FIG. 6, the billet 11 arrives in the dumping position IV because of the screw turn 7,8, designed with different pitches and the first following billet 12 arrives in the braking position III, while the second following billet 13 remains in the entry position I. The billet 11 arrives out of the dumping position IV onto the turnover cooling bed 4 provided with jagged receiving recesses or notches. There it is taken over by rakes (hoisting beams) 21 and simultaneously turned during the cyclical forward movement of the transverse conveyor arrangement 17.

Figure 8:
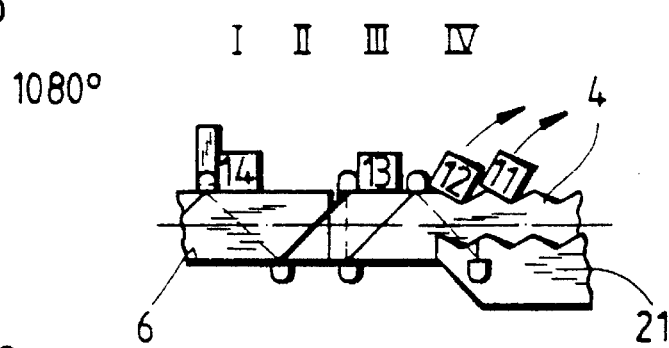
Figure 9:
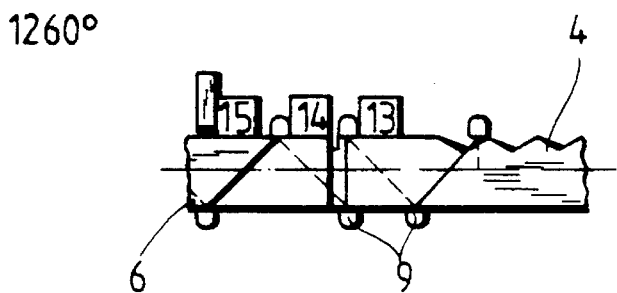
Figure 10:
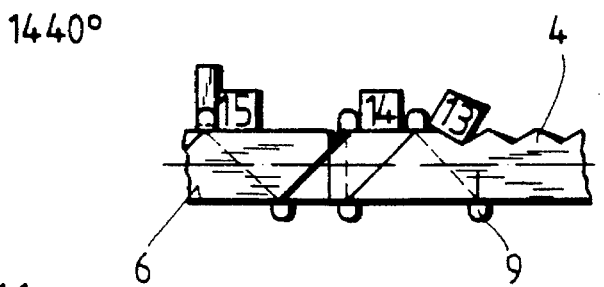
Figure 11:
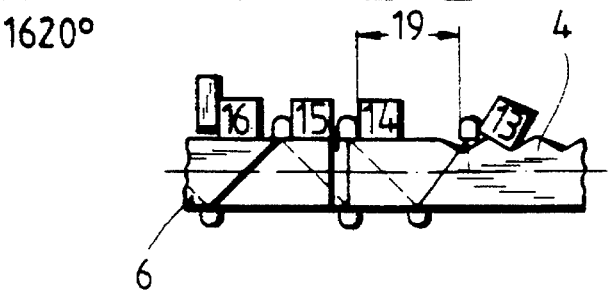

As is diagrammatically outlined in FIG. 8, the ends of the transverse conveyor roller 6 facing the cooling bed 4 are designed so that the billets 11 to 16 are transported out of the first notch of the rake 21 into the second notch and only after that are cyclically conveyed further from notch to notch by the mobile rakes 21 of the cooling bed 4. In this way a double occupancy of the cooling bed 4 can be achieved when processing billets having small dimensions. In the case of large billet dimensions, only every second notch of the rakes 21 is occupied due to space reasons.

Figure 12:
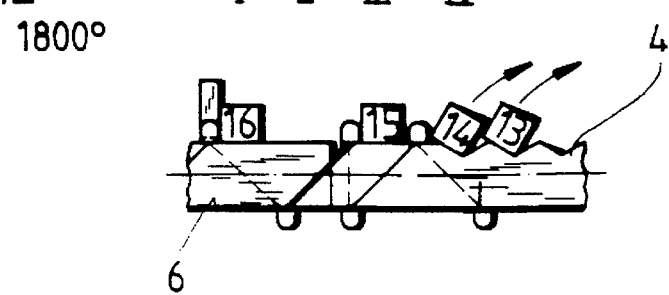

The sequence described above is repeated with each new runout follow up billet 14–16, with each 180° rotation of the transverse conveyor rollers 6, as is made clear in FIGS. 7–12, wherein FIG. 12 shows a situation after five complete roller revolutions (1800°). Irrespective however of the speed with which the billets run out onto the transverse conveyor roller 6, it is achieved during their conveying in the transverse conveyor direction 17, because of the differing pitches of the screw turn 7,8, that during the displacement of one billet into the braking position III, a following billet remains unaffected in the entry position I and the spacing between a billet in the dumping position IV and one in the braking position III can always be maintained constant.

While the invention has been illustrated and described as embodied in a billet live roller feed bed, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A billet live roller feed bed, arranged upstream of a cooling bed for transferring a plurality of billets onto the cooling bed, which extend transverse to said roller feed bed, said roller feed bed comprising transverse conveyor rollers for transferring the plurality of billets from the billet live roller feed bed in a conveyance direction onto the cooling bed, wherein said conveyor rollers have an entry position configured at ends of said conveyor rollers remote from the cooling bed and a braking position configured at ends of said conveyor rollers adjacent to the cooling bed, and wherein said conveyor rollers have a first screw turn having a pitch proceeding from said entry position and corresponding at least to a largest occurring billet dimension, and a second screw turn extending in said brake position and having a zero pitch across a 180° sector of said conveyor rollers, whereby one of the plurality of billets dwells at said entry and brake positions while others of the plurality of billets are conveyed laterally between said entry and brake position and away from said brake position.

2. The live roller feed bed of claim 1, wherein the transverse conveyor rollers are provided with beads forming the screw turns.

3. The live roller feed bed of claim 1, and further comprising a braking chute arranged in the braking region.

4. The live roller feed bed of claim 1, wherein the cooling bed is a notched rake type colling bed.

5. The live roller feed bed of claim 4, wherein the transverse conveyor rollers have ends that face the cooling bed and are configured for transferring billets from a first notch into a second notch of the rakes of the cooling bed.

\* \* \* \* \*